(12) United States Patent
Matsuoka et al.

(10) Patent No.: US 11,919,381 B2
(45) Date of Patent: Mar. 5, 2024

(54) ELECTRIC VEHICLE

(71) Applicant: HONDA MOTOR CO., LTD., Tokyo (JP)

(72) Inventors: Kiyohiko Matsuoka, Guangzhou (CN); Jun Huang, Guangzhou (CN); Yao Yang, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 17/548,648

(22) Filed: Dec. 13, 2021

(65) Prior Publication Data

US 2022/0185090 A1 Jun. 16, 2022

(30) Foreign Application Priority Data

Dec. 14, 2020 (CN) .......................... 202011468188.4

(51) Int. Cl.
*B60K 1/04* (2019.01)
*B60L 50/60* (2019.01)
*B60L 50/64* (2019.01)
*B62D 21/15* (2006.01)
*B62D 27/02* (2006.01)

(52) U.S. Cl.
CPC ................ *B60K 1/04* (2013.01); *B60L 50/64* (2019.02); *B60L 50/66* (2019.02); *B62D 21/15* (2013.01); *B62D 27/023* (2013.01); *B60K 2001/0438* (2013.01)

(58) Field of Classification Search
CPC ... B60K 1/04; B60K 2001/0438; B60L 50/64; B60L 50/66; B62D 21/15; B62D 27/023
See application file for complete search history.

(56) References Cited

U.S. PATENT DOCUMENTS

| 10,994,788 B2 * | 5/2021 | Otoguro | .................. B60L 50/66 |
| 2017/0217296 A1 * | 8/2017 | Nomura | ............... B62D 21/152 |
| 2018/0370577 A1 * | 12/2018 | Takahashi | ................ B60K 1/04 |

FOREIGN PATENT DOCUMENTS

| CN | 103429487 | | 12/2013 |
| JP | 2017035918 A | * | 2/2017 |

OTHER PUBLICATIONS

Text version of Onodera (JP 2017035918 A) (Year: 2017).*
Text version of Ji (CN 109204484 A) (Year: 2019).*

* cited by examiner

*Primary Examiner* — James A Shriver, II
*Assistant Examiner* — Nicholas R. Kandas
(74) *Attorney, Agent, or Firm* — Amin, Turocy & Watson, LLP

(57) ABSTRACT

An electric vehicle includes a battery pack for driving the electric vehicle; and a vehicle body reinforcing structure member having at least a cross connection structure, wherein a left side and a right side of the vehicle body reinforcing structure member are fixed to a left side and a right side of a vehicle body respectively, and at least a portion of the vehicle body reinforcing structure member is fixed to the battery pack.

12 Claims, 6 Drawing Sheets

ELECTRIC VEHICLE

CROSS-REFERENCE TO RELATED APPLICATION

The priority is claimed based on a Chinese Patent Application No. 202011468188.4, filed on Dec. 14, 2020. The content of the Chinese Patent Application is incorporated herein by reference.

TECHNICAL FIELD

The present disclosure relates to a technical field of a vehicle structure. More specifically, the present disclosure relates to an electric vehicle.

BACKGROUND ART

With the development of electric vehicles, more and more electric vehicle appear on the road. Generally, the battery pack of the electric vehicle is attached to the bottom portion of the vehicle. It is easy to cause the imbalance of the vehicle due to the existence of the battery pack. In order to ensure the followability when the vehicle turns, it is necessary to improve the rigidity at the local portion of the vehicle.

In Patent Document 1, a structure of a front portion of a vehicle body is disclosed. This structure of the front portion of the vehicle body includes a pair of front vertical beams positioned in a front cabin at the front side of the vehicle cabin and extending in the front-rear direction of the vehicle body, a pair of strut towers disposed at two sides along a width direction of the front cabin in the front cabin and having a front wheel suspension provided therein, and a reinforcing member joined with the upper portions of the strut towers and the front vertical beam opposite to the strut towers and extending therebetween. According to the above-described structure, the torsional rigidity and the lateral bending rigidity of the vehicle body are improved. However, by attaching the battery pack thereto, it is possible the imbalance of the vehicle occurs due to lack of rigidity of the vehicle body.

CITATION LIST

Patent Document

[Patent Document 1] Chinese Patent Application Publication No. 103429487

SUMMARY

The present invention is made in consideration of the above circumstances, and an objection of the present disclosure is to provide an electric vehicle to avoid the situation that the imbalance of the vehicle occurs due to lack of the rigidity of the vehicle body when the battery pack is attached thereto in the conventional electric vehicle.

According to a first aspect of the present disclosure, an electric vehicle includes a battery pack for driving the electric vehicle; and a vehicle body reinforcing structure member having at least a cross connection structure, wherein a left side and a right side of the vehicle body reinforcing structure member are fixed to a left side and a right side of a vehicle body respectively, and at least a portion of the vehicle body reinforcing structure member is fixed to the battery pack.

According to the above-described configuration, the electric vehicle provides a vehicle body reinforcing structure member to reinforce the vehicle body, ensure the rigidity of the vehicle body, and avoid the avoid the imbalance occurred in the vehicle by fixing the left side and the right side of the vehicle body reinforcing structure member having the cross connection structure to the left side and the right side of the vehicle body. At the same time, by fixing at least one portion of the vehicle body reinforcing structure member to the battery pack, it is possible to improve the stability of the battery pack and reduce shaking during the running of the vehicle. The cross connection structure can definitely improve the rigidity and the stability of the whole vehicle body reinforcing structure.

In a configuration example, the vehicle body reinforcing structure member may include a reinforcing structure main body attached to the vehicle body and connected to the battery pack, and the reinforcing structure main body may at least include a first reinforcing rod and a second reinforcing rod.

According to the above-described configuration, by attaching the reinforcing structure main body to the vehicle body and connecting the reinforcing structure main body to the battery pack, the first reinforcing rod and the second reinforcing rod of the reinforcing structure main body reinforce the vehicle body. Accordingly, the structural strength of the vehicle body is improved. The first reinforcing rod and the second reinforcing rod are connected to the battery pack so as to improve the stability of the battery pack and avoid the shaking of the heavy battery pack during the running of the vehicle.

In a configuration example, the second reinforcing rod may be at least one set of combination rods which are cross connected with the first reinforcing rod.

According to the above-described configuration, the at least one set of combination rods are connected to the first reinforcing rod, that is, the first reinforcing rod and the second reinforcing rod are at least crossed and connected with each other. The cross connection structure has a better structural strength and stability such that the reinforcing structure main body including at least the first reinforcing rod and the second reinforcing rod has a better rigidity and stability. By connecting the reinforcing structure main body to the vehicle body and the battery pack, it is possible to reinforce the structural rigidity of the vehicle body while improving the stability of the battery pack.

In a configuration example, the second reinforcing rod may include a first strut and a second strut which are independently disposed, the first strut and the second strut may be disposed at two opposing sides of the first reinforcing rod and form a cross connection structure, and a central axis of the first reinforcing rod, a central axis of the first strut, and a central axis of the second strut may be positioned in a same plane.

According to the above-described configuration, the second reinforcing rod includes the first strut and the second strut being independent from each other. During the attachment process, the first strut and the second strut are disposed at the two sides of the rod main body of the first reinforcing rod opposing each other to form the cross connection structure. According to the configuration, it is possible to avoid the interference when the first reinforcing rod and the second reinforcing rod are crossed and connected while securing the structural strength of the cross connection structure. At the same time, the structure in which the central axis of the first reinforcing rod, the central axis of the first strut, and the central axis of the second strut are positioned in the same plane is configured to reduce the space occupied by the cross connection structure and avoid the generation of noise generated when the first reinforcing rod and the second reinforcing rod collide with each other.

In a configuration example, the reinforcing structure main body may include a fixing bracket attached to the cross connection structure.

According to the above-described configuration, the fixing bracket is attached to the cross connection structure, that is, the fixing bracket is used to reinforce and protect the cross connection structure so as to improve the structural strength and the stability of the whole reinforcing structure main body.

In a configuration example, the vehicle body reinforcing structure member may include a battery pack connection bracket connected to at least one of the first reinforcing rod and the second reinforcing rod, and one end of the battery pack connection bracket may be attached to a bottom portion of the vehicle body, and the other end of the battery pack connection bracket may be connected to the battery pack.

According to the above-described configuration, the two ends of the battery pack connected to the first reinforcing rod and/or the second reinforcing rod are attached to the bottom portion of the vehicle body and the battery pack such that the first reinforcing rod and the second reinforcing rod are connected to the vehicle body and the battery pack respectively. Accordingly, it is possible to effectively solve the problem that it is difficult to directly connect the reinforcing structure main body to the battery pack and the vehicle body. At the same time, the battery pack connection bracket forms a stable triangle structure together with the first reinforcing rod and the second reinforcing rod so as to improve the structural strength of the reinforcing structure main body. Due to the battery pack connection bracket, it is possible to fix the battery pack to the reinforcing structure main body and the vehicle body at the same time so as to further improve the stability of the battery pack.

In a configuration example, the battery pack connection bracket may be connected to the first reinforcing rod and the second reinforcing rod at a position where the first reinforcing rod and the second reinforcing rod are apart away from each other by the maximum distance.

According to the above-described configuration, the battery pack connection bracket is connected to the first reinforcing rod and the second reinforcing rod and the connection position of the battery pack connection bracket is at the position where the first reinforcing rod and the second reinforcing rod are apart away from each other by the maximum distance. Accordingly, the battery pack connection bracket is configured to improve the structural strength and the stability of the reinforcing structure main body by partitioning the interval between the first reinforcing rod and the second reinforcing rod into several triangle type structure.

In a configuration example, the vehicle body reinforcing structure member may further include a battery protection plate attached to the battery pack; and a reinforcing bracket connected to the first reinforcing rod and/or the second reinforcing rod and having an end attached to the battery protection plate.

According to the above-described configuration, the battery pack is protected by adding the battery protection plate to the battery pack. At the same time, the reinforcing bracket is used to further improve the connection strength between the battery protection plate and the first reinforcing rod and/or the second reinforcing rod so as to improve the whole structural strength of the vehicle body reinforcing structure member. Also, the reinforcing bracket and the first reinforcing rod and/or the second reinforcing rod form the stable triangle structure so as to effectively improve the structural strength and stability of the reinforcing structure main body.

In a configuration example, end portions of the first reinforcing rod may be connected to end portions of the second reinforcing rod, respectively.

According to the above-described configuration, the end portions of the first reinforcing rod are connected to the end portions of the second reinforcing rod, that is, the first reinforcing rod and the second reinforcing rod are crossed and connected, and the end portions of the first reinforcing rod and the end portions of the second reinforcing rod are connected with each other while forming the cross connection structure. Accordingly, the first reinforcing rod and the second reinforcing rod are crossed and connected at the two end portions being opposite to each other and the intermediate portions so as to improve the structural strength of the reinforcing structure main body.

In a configuration example, the vehicle body reinforcing structure member may include a connection member, and the end portions of the first reinforcing rod may be connected to the end portions of the second reinforcing rod by the connection member and fixed at the left side and the right side of the vehicle body.

According to the above-described configuration, by adopting the connection member and fixing the end portions of the first reinforcing rod and the second reinforcing rod to the left side and the right side of the vehicle body by the connection member, it is possible to effectively solve the problem that it is inconvenient to connect the end portion of the first reinforcing rod and the end portions of the second reinforcing rod and it is difficult to directly fix the first reinforcing rod and the second reinforcing rod to the vehicle body.

In a configuration example, the first reinforcing rod and the second reinforcing rod may be hollow rods.

According to the above-described configuration, by forming the first reinforcing rod and the second reinforcing rod as the hollow rods, it is possible to secure the structural strength while effectively reducing the whole weight and reducing the cost of the vehicle body reinforcing structure member.

In a configuration example, the vehicle body reinforcing structure member may be attached to a bottom side of the vehicle body and adjacent to a rear portion of the battery pack.

According to the above-described configuration, by attaching the vehicle body reinforcing structure member to the bottom side of the vehicle body and connecting the vehicle body reinforcing structure member to the battery pack from the rear portion thereof, it is possible to strengthen the rear portion of the vehicle body whose rigidity is weak and improve the stability of the battery pack.

Advantageous Effects of Invention

According to the electric vehicle as described in each aspect of the present disclosure shown above, compared with the conventional electric vehicle, it is possible to avoid the imbalance occurred in the vehicle when the rigidity of the vehicle body is improved by attaching the battery pack.

DESCRIPTION OF EMBODIMENTS

In order to make the technical problem, the solutions and the effects of the present application more clear, hereinafter, embodiments of the present application will be described with reference to the figures. Hereinafter, the following embodiments are only used to describe the present application and are not used to limit the present application. Also, the configurations shown in figures are only specific examples of the present application and the person with ordinary skill in the art can achieve other figures based on the enclosed figures of the present application.

In the following description, it is noted that the locations and positional relationships indicated by the terms "length", "width", "upper", "lower", "front", "rear", "left", "right", "vertical", "horizontal", "top", "bottom", "inside", and "outside" should be understood with reference to the enclosed figures and such terms are used to make the description to be simple. Such terms are not used to indicate or suggest the apparatus and the element thereof have the particular directions and positions, to be configured and operated in the particular directions and at the specific positions, and the present disclosure is not limited by these terms. For a person with ordinary skill in the art, the specific meaning of the above-mentioned terms may be suitably understood according to the actual situation.

The terms "first", "second", and "third" are only used for making the description easy to understand, and they are not used to indicate or suggest the importance of the configurations or implicit the amount of the technical features. Unless otherwise defined, the term "a plurality of" means that an amount equal to two or more than two.

In the following description, unless otherwise defined, the terms "attach", "communicate", "connect" or the like should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

Figure 3:
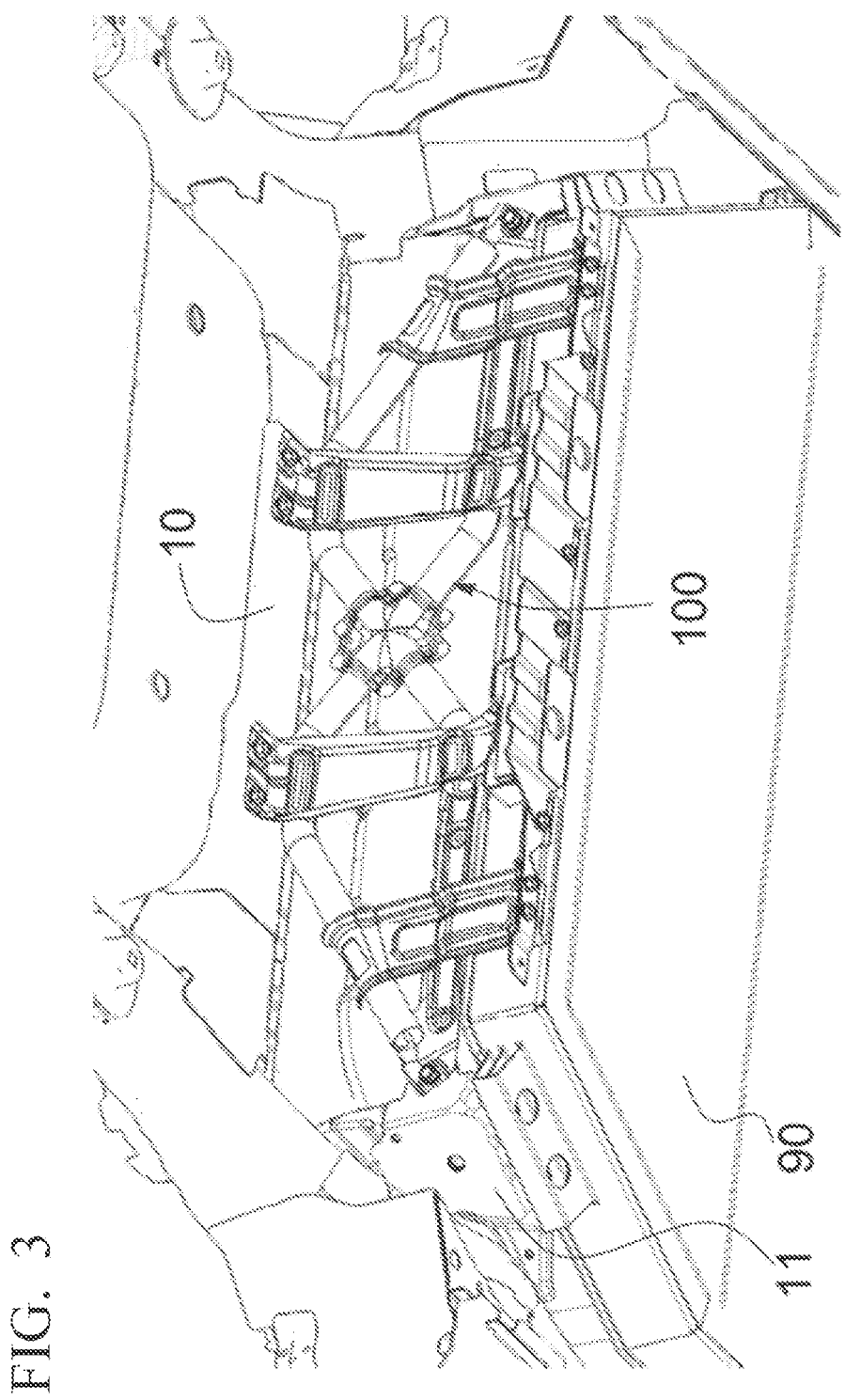
FIG. 3 is a schematic view showing the vehicle body reinforcing structure member attached to the bottom side of the electric vehicle according to the present embodiment.
Figure 4:
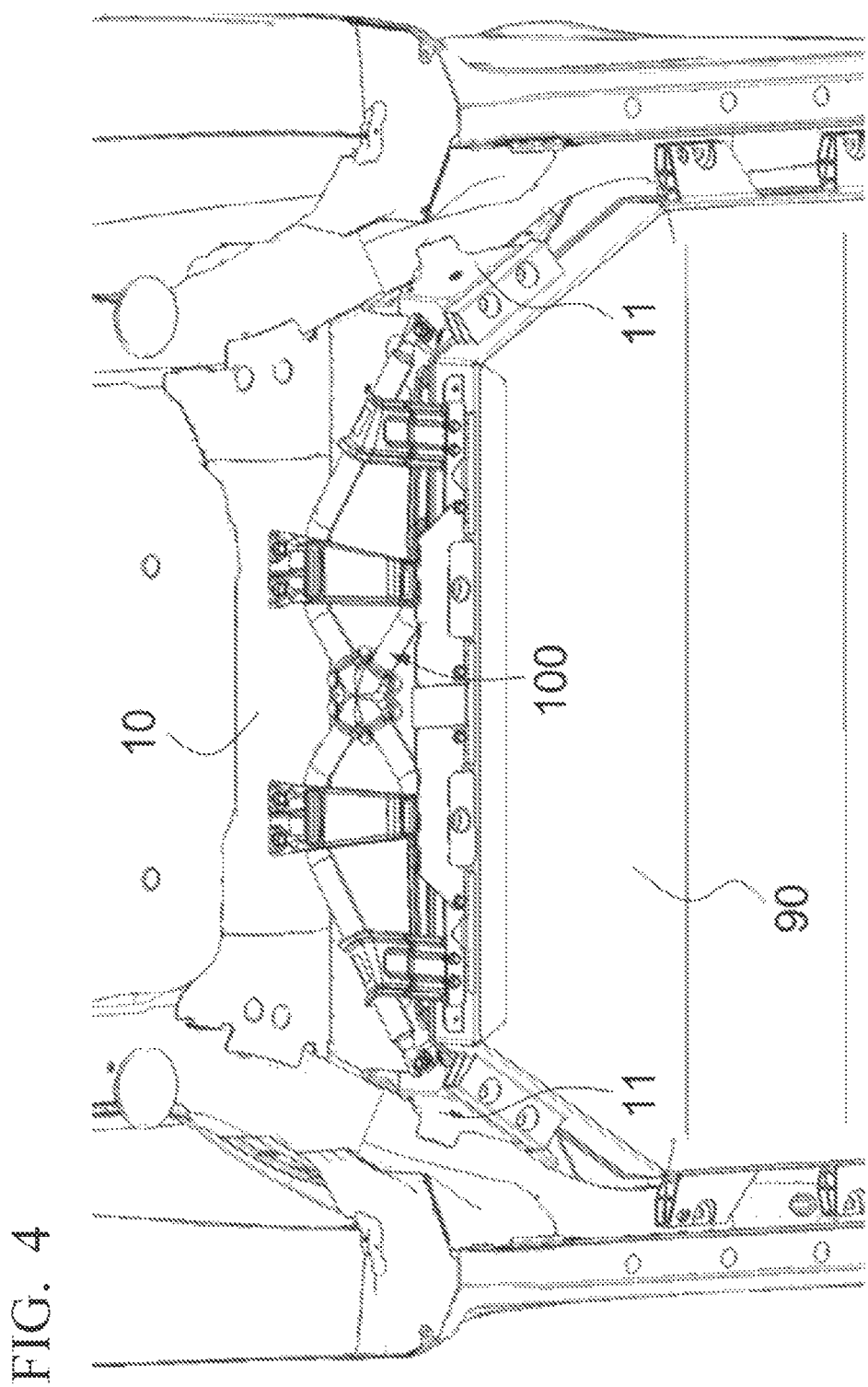
FIG. 4 is a schematic view showing the vehicle body reinforcing structure member attached to the bottom side of the electric vehicle from another angle according to the present embodiment.

As shown in FIG. 3 and FIG. 4, an electric vehicle according to the present disclosure includes a battery pack 90 for driving the vehicle and a vehicle body reinforcing structure member 100 having at least one cross connection structure 31. The left side and the right side of the vehicle body reinforcing structure member 100 are fixed to the left side and the right side of the vehicle body 10 and at least one portion of the vehicle body reinforcing structure member 100 is fixed to the battery pack 90.

The electric vehicle according to the present disclosure is configured to make the left and right sides of the vehicle body reinforcing structure member 100 having the cross connection structure 31 to be fixed to the left and right sides of the vehicle body 10 so as to reinforce the vehicle body 10. Accordingly, the rigidity of the vehicle body 10 is ensured and the problem of rigidity imbalance of the vehicle is avoided. At the same time, at least one portion of the vehicle body reinforcing structure member 100 is fixed to the battery pack 90 so as to improve the stability of the battery pack 90 and reduce the shaking during the running of the vehicle.

Figure 1:
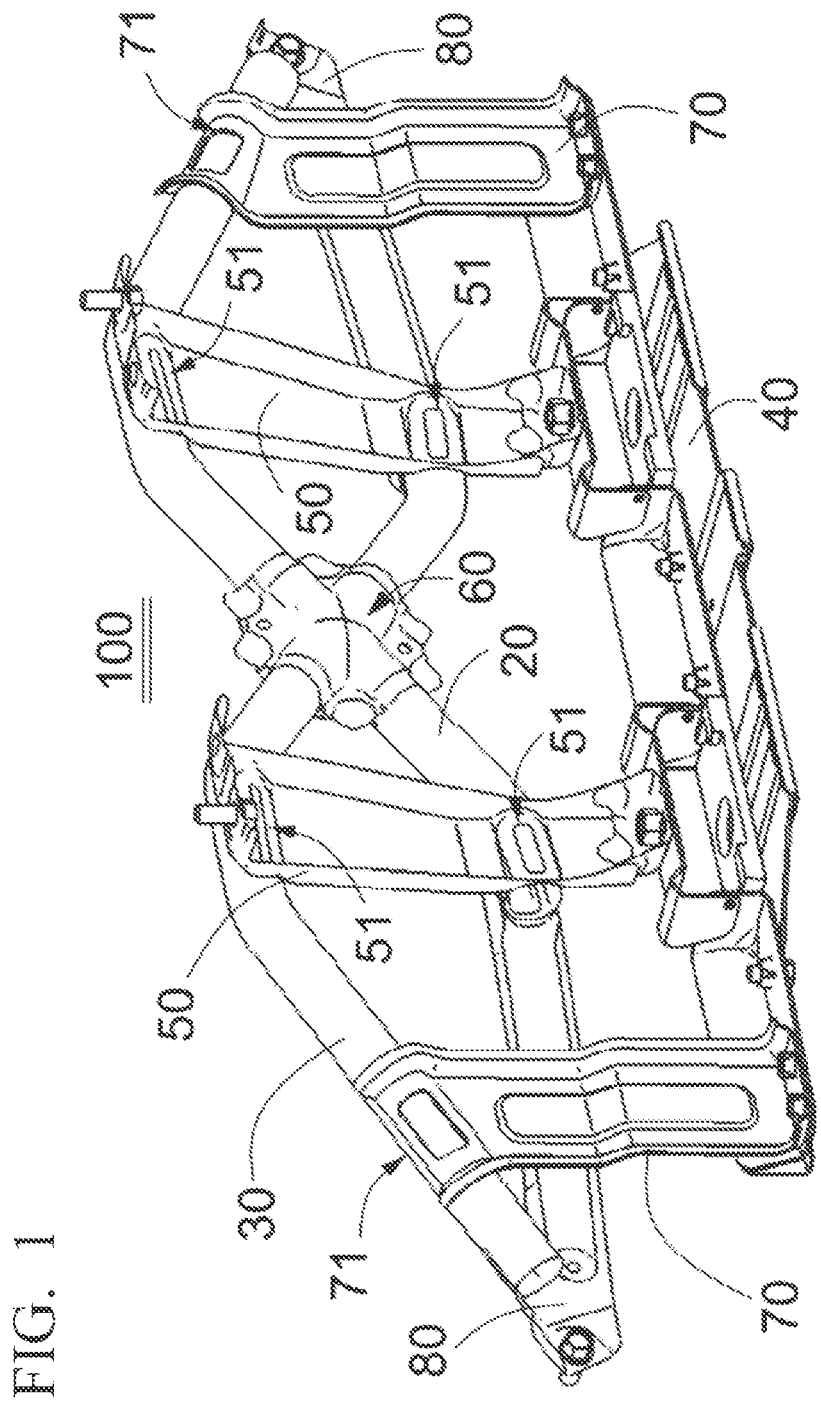
FIG. 1 is a schematic view showing a structure of a vehicle body reinforcing structure member of an electric vehicle according to an embodiment of the present disclosure.
Figure 2:
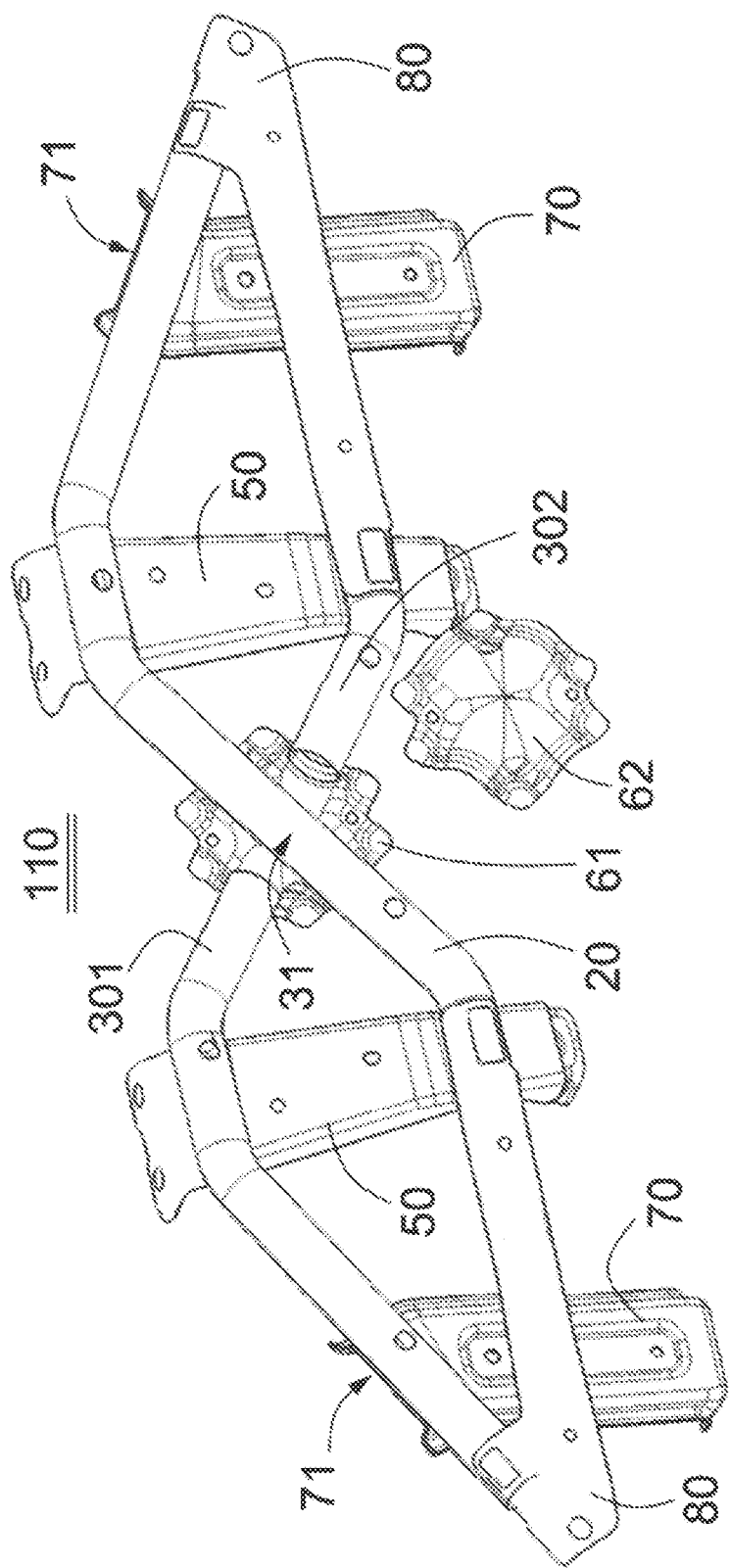
FIG. 2 is a schematic view showing a structure of a reinforcing structure main body according to the present embodiment.

As shown in FIG. 1 and FIG. 2, in an example, the vehicle body reinforcing structure member 100 includes a reinforcing structure main body 110 attached to the vehicle body 10 and connected to the battery pack 90. Generally, the volume and the weight of the battery pack 90 are large such that during the running of the vehicle, it is easy for the battery pack 90 to shake and the stability of the whole vehicle is low. Accordingly, by attaching the reinforcing structure main body 110 to the bottom side of the vehicle body 10 and connecting the reinforcing structure main body 110 to the battery pack 90, the reinforcing structure main body 100 does not only reinforce the structural strength of the vehicle body 10, but also improving the safety of the battery pack 90 and the safety of the whole vehicle by being connected to the battery pack 90 and locked thereto.

More specifically, the reinforcing structure main body 110 at least includes a first reinforcing rod 20 and a second reinforcing rod 30. By attaching the reinforcing structure main body 110 to the vehicle body 10 and connecting the reinforcing structure main body 110 to the battery pack 90, the first reinforcing rod 20 and the second reinforcing rod 30 of the reinforcing structure main body 110 improve the structural strength of the vehicle body 10 by reinforcing the vehicle body 10. The first reinforcing rod 20 and the second reinforcing rod 30 are connected to the battery pack 90 so as to improve the stability of the battery pack 90 and avoid the shaking of the battery pack 90 with the large weight during the running of the vehicle.

The reinforcing structure main body 110 may be understood to include one first reinforcing rod 20 and one second reinforcing rod 30. As shown in FIG. 1 and FIG. 2, the cross connection structure 31 having the stronger structural strength and the higher stability is configured by connecting the rod main body of the first reinforcing rod 20 and the second reinforcing rod 30. The structural strength and the stability of the reinforcing structure main body 110 having such cross connection structure 31 is further improved.

Figure 5:
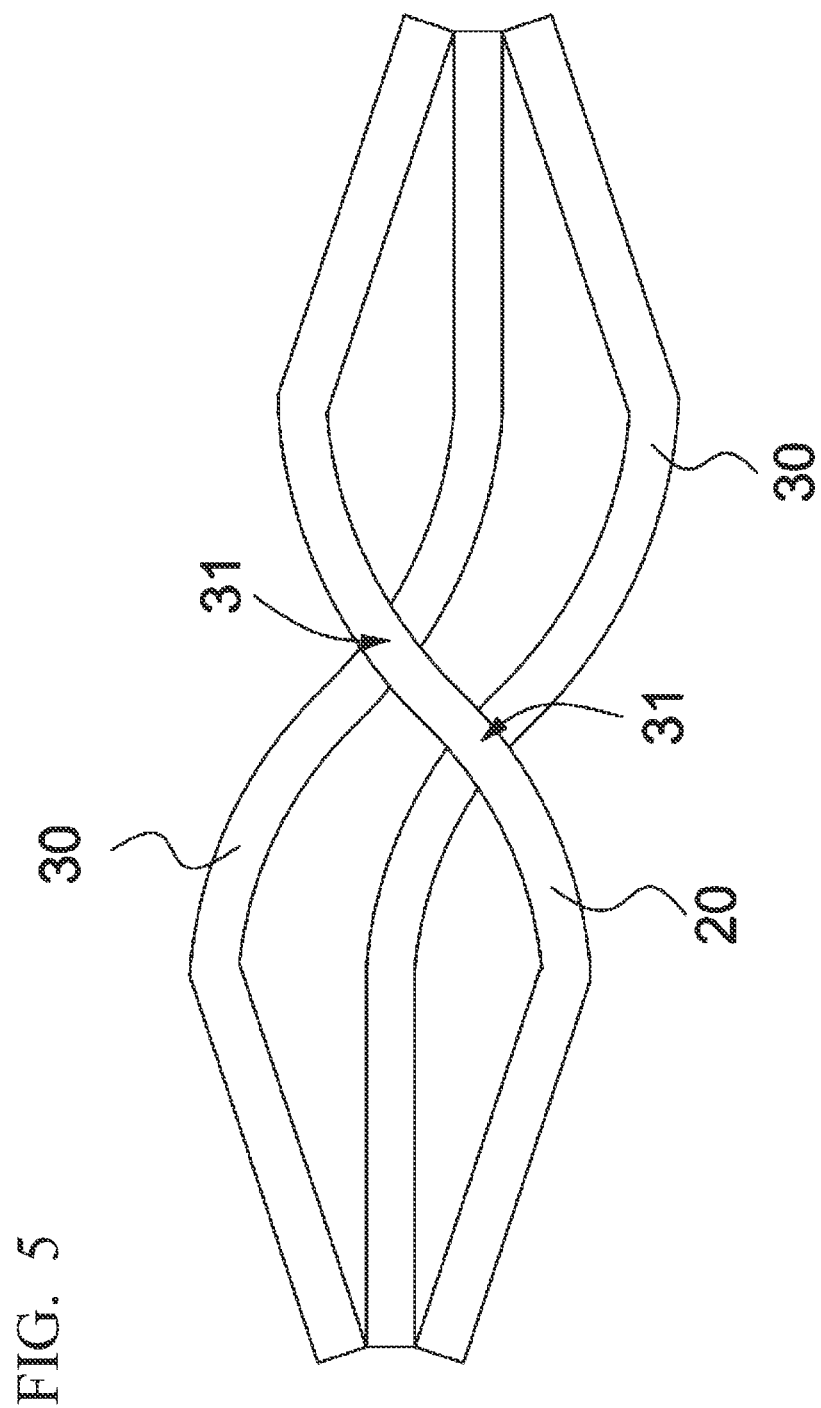
FIG. 5 is another schematic view showing a structure of the vehicle body reinforcing structure member of an electric vehicle according to an embodiment of the present disclosure.

The reinforcing structure main body 110 may include one first reinforcing rod 20 and two or more second reinforcing rods 30. As shown in FIG. 5, each of the plurality of second reinforcing rods 30 is connected to the rod main body of the first reinforcing rod 20 to have intervals between the second reinforcing rods 30 such that two or more cross connection structures 31 are configured by the first reinforcing rod 20 and each second reinforcing rod 30. The reinforcing structure main body 110 having such two or more cross connection structures 31 are configured to have a further improved structural strength and stability.

Figure 6:
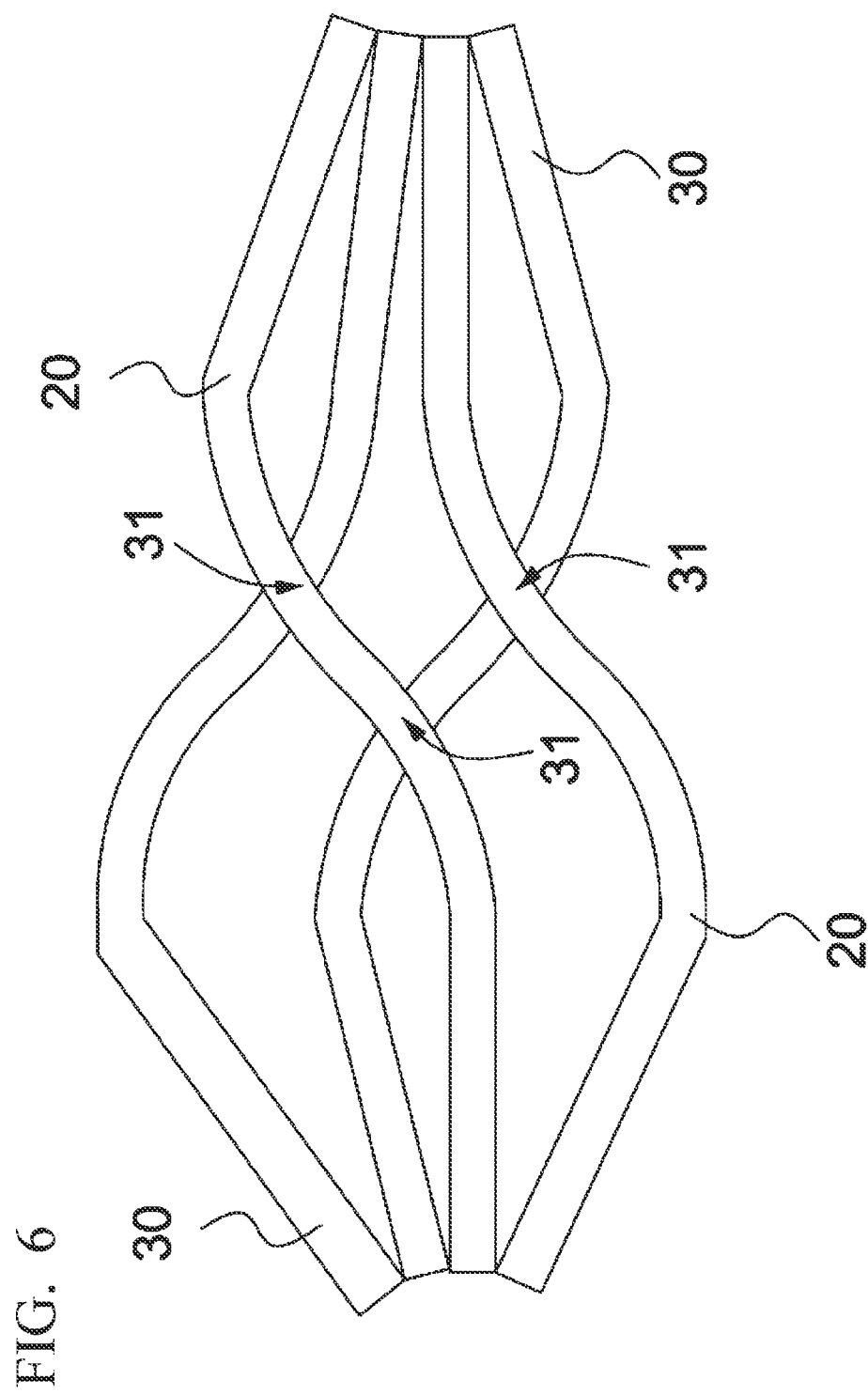
FIG. 6 is a further schematic view showing a structure of the vehicle body reinforcing structure member of an electric vehicle according to an embodiment of the present disclosure.

The reinforcing structure main body 110 may have two or more first reinforcing rods 20 and a plurality of second reinforcing rods 30. As shown in FIG. 6, the number of the second reinforcing rods 30 is equal to or more than the number of the first reinforcing rods 20, and the first reinforcing rods 20 are not crossed with each other. By making each of the plurality of second reinforcing rods 30 to be crossed and connected to each first reinforcing rod 20, each first reinforcing rod 20 is crossed and connected to at least one second reinforcing rod 30. In other words, each first reinforcing rod 20 forms at least one cross connection structure 31 with the second reinforcing rod 30. Accordingly, the reinforcing structure main body 110 having two or more first reinforcing rods 20 and the plurality of second reinforcing rods 30 has a better structural strength and stability.

The electric vehicle according to the present disclosure is configured to make the reinforcing structure main body 110 to be attached to the vehicle body 10 and connected to the battery pack 90 such that the first reinforcing rod 20 and the second reinforcing rod 30 of the reinforcing structure 10 reinforce the vehicle body 10 and improve the structural strength of the vehicle body 10. The first reinforcing rod 20 and the second reinforcing rod 30 are connected to the battery pack 90 so as to improve the stability of the battery pack 90 and avoid the shaking occurred in the heavy battery pack 90 during the running of the vehicle.

As shown in FIG. 1 to FIG. 4, in an example, the second reinforcing rod 30 is a set of combination rods which are crossed and connected with the first reinforcing rod 20. At least one set of combination rods are crossed and connected with the first reinforcing rod 20, that is, the first reinforcing rod 20 is crossed and connected with the second reinforcing rod 30 at least one time. The structural rigidity and stability of the cross connection is superior such that the reinforcing structure main body 110 including at least the first reinforcing rod 20 and the second reinforcing rod 30 has a higher rigidity and stability. By attaching the reinforcing structure main body 110 to the vehicle body 10 and connecting the reinforcing structure main body 110 to the battery pack 90, the structural rigidity of the vehicle body 10 is reinforced and the stability of the battery pack 90 is improved. Here, the second reinforcing rod 30 may be one set of combination rods which are crossed and connected with the first reinforcing rod 20, and the second reinforcing rod 30 may be several sets of combination rods which are crossed and connected with the first reinforcing rod 20 that are apart from each other with intervals therebetween. The specific number of the combination rods may be determined due to the actual situation.

As shown in FIG. 1 and FIG. 2, in an example, the second reinforcing rod 30 includes a first strut 301 and a second strut 302 that are provided independently, and the first strut 301 and the second strut 302 are disposed at the two opposing sides of the first reinforcing rod 20 to form the cross connection structure 31. The central axis of the first reinforcing rod 20, the central axis of the first strut 301, and the central axis of the second strut 302 are on the same plane. During the attachment process, the first strut 301 and the second strut 302 are disposed at the two opposing sides of the rod main body of the first reinforcing rod 20 so as to form the cross connection structure 31. Accordingly, it is possible to avoid the situation that the first reinforcing rod 20 and the second reinforcing rod 30 interfere with each other at the time of cross connection while ensuring the structural strength of the cross connection structure 31. At the same time, the structure that the central axis of the first reinforcing rod 20, the central axis of the first strut 301, and the central axis of the second strut 302 are on the same plane is configured to reduce the occupied space of the cross connection structure 31 and avoid the generation of noise when due to the collision of the first reinforcing rod 20 and the second reinforcing rod 30. It should be understood that the second reinforcing rod 30 may include a set of the first struts 301 and a set of the second struts 302 that are provided independently. The second reinforcing rod 30 may include two or more sets of first struts 301 and second struts 302. Also, each set of the first struts 301 and the second struts 302 are disposed at the opposing sides of the first reinforcing rod 20 to form several cross connection structures 31.

As shown in FIG. 1 to FIG. 4, in an example, the reinforcing structure main body 110 includes a fixing bracket 60 attached to the cross connection structure 31. By attaching the fixing bracket 60 to the cross connection structure 31, that is, by using the fixing bracket 60 to reinforce and protect the cross connection structure 31, the structural strength and stability of the whole reinforcing structure main body 110 are improved. Here, the fixing bracket 60 may use a covering type structure so as to completely cover the cross connection structure 31. More specifically, the fixing bracket 60 includes a front fixing frame 61 and a rear fixing frame 62 attached to the front fixing frame 61. A front accommodation groove is formed at one side of the front fixing frame 61, and a rear accommodation groove is formed at one side of the rear fixing frame 62. When the front fixing frame 61 and the rear fixing frame 62 are connected and attached thereto, the front accommodation groove and the rear accommodation groove together form an accommodation cavity for disposing the first reinforcing rod and the second reinforcing rod 30. The front fixing frame 61 and the rear fixing frame 62 are attached at the two opposing sides of the cross connection structure 31 configured by the first reinforcing rod 20 and the second reinforcing rod 30, and the front fixing frame 61 and the rear fixing frame 62 are joined by connecting bolts or welding such that the cross connection portion of the first reinforcing rod 20 and the second reinforcing rod 30 is locked in the accommodation cavity. Accordingly, the structural strength of the cross connection structure 31 is effectively strengthened.

As shown in FIG. 1 to FIG. 4, in an example, the vehicle body reinforcing structure member 100 includes a battery pack connection bracket 50 connected to the first reinforcing rod 20 and/or the second reinforcing rod 30. One end of the battery pack connection bracket 50 is connected to the vehicle body 10 and the other end thereof is connected to the battery pack 90. The two ends of the battery pack connection bracket 50 connected to the first reinforcing rod 20 and/or the second reinforcing rod 30 are attached to the bottom portion of the vehicle body 10 and the battery pack 90 such that the first reinforcing rod 20 and/or the second reinforcing rod 30 are connected to the vehicle body 10 and the battery pack 90 respectively. Accordingly, it is possible to effectively solve the situation in which the reinforcing structure main body 110 including the first reinforcing rod 20 and the second reinforcing rod 30 and formed in a round rod shape is difficult to be directly connected to the vehicle body 10 and the battery pack 90 and it becomes easy to attach the reinforcing structure main body 110. At the same time, the battery pack connection bracket 50, the first reinforcing rod 20, and the second reinforcing rod 30 form the stable triangle shape structure together so as to improve the structural strength and stability of the reinforcing structure main body 110. Here, the method of connecting the battery pack connection bracket 50 to the first reinforcing rod 20 and the second reinforcing rod 30 may be welding, bolt connection, and locking or the like. In the present example, the battery pack connection bracket 50 includes two arc structures 51. The first reinforcing rod 20 and the second reinforcing rod 30 are disposed in the corresponding arc structure 51, for example, the first reinforcing rod 20 and the second reinforcing rod 30 are connected to the corresponding arc structure 51 by welding such that it is possible to make the first reinforcing rod 20 and the second reinforcing rod 30 to be welded to the battery pack connection bracket 50 while locking the first reinforcing rod 20 and the second reinforcing rod 30 by a certain degree due to the arc structure 51 such that the whole structural strength is improved.

As shown in FIG. 1 and FIG. 2, in an example, the battery pack connection bracket 50 is connected to the first reinforcing rod 20 and the second reinforcing rod 30 at a position where the interval between the first reinforcing rod 20 and the second reinforcing rod 30 is the maximum value. Since the battery pack connection bracket 50 is connected to the first reinforcing rod 20 and the second reinforcing rod 30, and the connection position of the battery pack connection bracket 50 is at the position where the interval between the first reinforcing rod 20 and the second reinforcing rod 30 is the maximum value, the largest triangle type structure among the battery pack connection bracket 50, the first reinforcing rod 20, and the second reinforcing rod 30 are formed so as to improve the structural strength and the stability of the reinforcing structure main body 110.

As shown in FIG. 1 and FIG. 2, in an example, the vehicle body reinforcing member 100 includes a battery protection plate 40 attached to the battery pack 90 and a reinforcing bracket 70 that is connected to the first reinforcing rod 20 and/or the second reinforcing rod 30, and an end of the reinforcing bracket 70 is attached to the battery protection plate 40. By additionally providing the battery protection plate 40 in the battery pack 90, it is possible to protect the battery pack 90 while using the reinforcing bracket 70 to further improve the connection strength between the battery protection plate 40 and the first reinforcing rod 20 and/or the second reinforcing rod 30, and the structural strength of the whole vehicle body reinforcing structure member 100. More specifically, the second reinforcing rod 30 is crossed and connected to the first reinforcing rod 20 such that the reinforcing bracket 70 may be connected to the first reinforcing rod 20, the reinforcing bracket 70 may be connected to the second reinforcing rod 30, or the reinforcing bracket 70 may be connected to the first reinforcing rod 20 and the second reinforcing rod 30 sequentially. At the same time, one end of the reinforcing bracket 70 is attached to the battery protection plate 40 so as to connect the reinforcing structure main body 110 with the battery protection plate 40. In the case in which the reinforcing bracket 70 is connected to the first reinforcing rod 20 and the second reinforcing rod 30 in sequence, the reinforcing bracket 70 forms the stable triangle structure with the first reinforcing rod 20 or the second reinforcing rod 30 so as to improve the structural strength and stability of the reinforcing structure main body 110. Here, the reinforcing bracket 70 includes a lock catching portion 71 formed in a concave groove shape, and the lock catching portion 71 is fitted by the first reinforcing rod 20 and/or the second reinforcing rod 30 to lock the first reinforcing rod 20 and/or the second reinforcing rod 30, and further the other end of the reinforcing bracket 70 is attached to the battery protection plate 40 by the bolt so as to improve the structural strength and stability of the reinforcing structure main body 110.

As shown in FIG. 1 to FIG. 4, in an example, the end portions of the first reinforcing rod 20 are connected to the end portions of the second reinforcing rod 30 respectively. The end portions of the first reinforcing rod 20 are directly or indirectly connected to the end portions of the second reinforcing rod 30, that is, the first reinforcing rod 20 and the second reinforcing rod 30 are crossed and connected with each other to form the cross connection structure 31. At the same time, the first reinforcing rod 20 and the second reinforcing rod 30 are directly or indirectly connected with each other and the end portions such that the first reinforcing rod 20 and the second reinforcing rod 30 are crossed and connected with each other at the end portions and the intermediate portions to form a stable "∞ (infinity)" shape structure to improve the structural strength of the reinforcing structure main body 110.

As shown in FIG. 1 to FIG. 4, in an example, the vehicle body reinforcing structure member 100 includes a connection member 80. The end portions of the first reinforcing rod 20 are connected to the end portions of the second reinforcing rod 30 via the connection member 80, and fixed to the left side and the right side of the vehicle body 10. The end portion of the first reinforcing rod 20 and the rend portion of the second reinforcing rod 30 are fixed to the left side and the right side of the vehicle body 10 so as to overcome the difficulty of connecting the end portion of the first reinforcing rod 20 and the end portion of the second reinforcing rod 30 and the difficult of directly fixing the end portion of the first reinforcing rod 20 and the end portion of the second reinforcing rod 30 to the vehicle body 10. Here, the connection member 80 is formed in a plate shape structure, and the connection member 80 may be connected to the first reinforcing rod 20 and/or the second reinforcing rod 30 by welding. The vehicle body 10 further includes a rear trailing arm bracket 11 provided to fix the battery pack 90 and the suspension of the vehicle body 10. When the connection member 80 is connected to the rear trailing arm bracket 11, it is possible to fix the vehicle body reinforcing structure member 100 to the two sides of the vehicle body 10 without further adding other members, thus the structure is simplified and the cost is reduced. The connection member 80 has a bolt hole, and the connection member 80 may be connected to the rear trailing arm bracket 11 of the vehicle body 10 by the bolt via the bolt hole.

As shown in FIG. 1 and FIG. 2, in an example, each of the first reinforcing rod 20 and the second reinforcing rod 30 is a hollow rod. Each of the first reinforcing rod 20 and the second reinforcing rod 30 is formed as the hollow rod so as to effectively reduce the whole weight and the cost of the vehicle body reinforcing structure member 100 while ensuring the structural strength.

As shown in FIG. 1 to FIG. 4, in an example, the vehicle body reinforcing member 100 is attached to the bottom side of the vehicle body 10 and attached to the position adjacent to the rear portion of the battery pack 90. The vehicle body reinforcing member 100 is attached to the bottom side of the vehicle body 10 and attached to the position adjacent to the rear portion of the battery pack 90 such that the vehicle body reinforcing member 100 is connected to the battery pack 90 from the rear portion of the battery pack 90 so as to strengthen the rear portion of the vehicle with the weak rigidity while improving the stability of the battery pack 90.

When the vehicle body reinforcing member 100 is attached thereto, the first reinforcing rod 20 is crossed and connected with the first strut 301 and the second strut 301 by the welding method to form the cross connection structure 31. At the same time, the front fixing frame 61 and the rear fixing frame 62 are connected and fixed to the two opposing sides of the cross connection structure 31 to form the fixing bracket 60. Accordingly, the cross connection structure 31 is covered by the accommodation cavity configured by the front fixing frame 61 and the rear fixing frame 62. The end of the first strut 301 that is apart away from the second strut 302 and the end of the second strut 302 that is apart from the first strut 301 are connected to the two ends of the first reinforcing rod 20 such that the first reinforcing rod 20, the first strut 301, and the second strut 302 are crossed and connected at the two end portions and the intermediate portion to form the stable "∞ (infinity)" shape structure. The battery pack connection bracket 50 is connected to the first reinforcing rod 20 and the second reinforcing rod 30 in sequence at the position where the interval between the first reinforcing rod 20 and the second reinforcing rod 30 is the maximum value and the two opposing ends of the battery pack connection bracket 50 are connected to the vehicle body 10 and the battery protection plate 40 such that the first reinforcing rod 20 and the second reinforcing rod 30 are connected to the vehicle body 10 and the battery pack 90 respectively. The two reinforcing brackets 70 are connected to the reinforcing structure main body 110 and positioned at the two sides of the cross connection structure 31 such that the reinforcing bracket 70 is connected to the first reinforcing rod 20 and/or the second reinforcing rod 30 and one end of the reinforcing bracket 70 is connected to the battery protection plate 40. Accordingly, the connection strength between the battery protection plate 40 and the first reinforcing rod 20 and/or the second reinforcing rod 30 is further improved and the structural strength of the whole reinforcing structure main body 110 is improved. The battery pack connection bracket 50 and the reinforcing bracket 70 form the plurality of stable triangle structures with the first reinforcing rod 20 and the second reinforcing rod 30 respectively so as to significantly improve the structural strength and stability of the reinforcing structure main body 110. The reinforcing structure main body 110 further includes the connection member 80, and the first reinforcing rod 20 and the second reinforcing rod 30 are connected to the connection member 80 and the connection member 80 to which the first reinforcing rod 20 and the second reinforcing rod 30 are connected is attached to the rear trailing arm brackets 11 at the two sides of the vehicle body 10 such that it is possible to effectively overcome the inconvenience of connecting the tubular first reinforcing rod 20 and the tubular second reinforcing rod 30 and the difficulty of fixing the first reinforcing rod 20 and the second reinforcing rod 30 to the rear trailing arm bracket 11 fixed to the vehicle body 10. Here, the first reinforcing rod 10, the first strut 301, and the second strut 302 are formed in the hollow rod structure so as to reduce the whole weight and the cost.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST 10 vehicle body reinforcing structure member
11 reinforcing structure main body
10 vehicle body
11 rear trailing arm bracket
20 first reinforcing rod
30 second reinforcing rod
301 first strut
302 second strut
31 cross connection structure
40 battery protection plate
50 battery pack connection bracket
51 arc structure
60 fixing bracket
61 front fixing bracket
62 rear fixing bracket
70 reinforcing bracket
71 lock catch portion
80 connection member
90 battery pack

What is claimed is:

1. An electric vehicle, comprising:
a battery pack for driving the electric vehicle; and
a vehicle body reinforcing structure member having at least a cross connection structure,
wherein a left side and a right side of the vehicle body reinforcing structure member are fixed to a left side and a right side of a vehicle body respectively,
at least a portion of the vehicle body reinforcing structure member is fixed to the battery pack,
the vehicle body reinforcing structure member at least includes a first reinforcing rod and a second reinforcing rod,
the second reinforcing rod is at least one set of combination rods which are cross connected with the first reinforcing rod,
the second reinforcing rod includes a first strut and a second strut which are independently disposed,
the first strut and the second strut are spaced apart at a cross connection portion with the first reinforcing rod,
a central axis of the first reinforcing rod, a central axis of the first strut, and a central axis of the second strut are positioned in a same plane, and
a fixing bracket is provided at the cross connection portion of the first strut and the second strut and the first reinforcing rod.

2. The electric vehicle according to claim 1,
wherein the vehicle body reinforcing structure member includes a reinforcing structure main body attached to the vehicle body and connected to the battery pack.

3. The electric vehicle according to claim 1,
wherein the first strut and the second strut are disposed at two opposing sides of the first reinforcing rod and form a cross connection structure.

4. The electric vehicle according to claim 2, wherein the reinforcing structure main body includes the fixing bracket attached to the cross connection structure.

5. The electric vehicle according to claim 2,
wherein the vehicle body reinforcing structure member includes a battery pack connection bracket connected to at least one of the first reinforcing rod and the second reinforcing rod, and
one end of the battery pack connection bracket is attached to a bottom portion of the vehicle body, and the other end of the battery pack connection bracket is connected to the battery pack.

6. The electric vehicle according to claim 5, wherein the battery pack connection bracket is connected to the first reinforcing rod and the second reinforcing rod at a position where the first reinforcing rod and the second reinforcing rod are apart away from each other by the maximum distance.

7. The electric vehicle according to claim 2,
wherein the vehicle body reinforcing structure member further comprises:
a battery protection plate attached to the battery pack; and
a reinforcing bracket connected to at least one of the first reinforcing rod and the second reinforcing rod and having an end attached to the battery protection plate.

8. The electric vehicle according to claim 2, wherein end portions of the first reinforcing rod are connected to end portions of the second reinforcing rod, respectively.

9. The electric vehicle according to claim 8,
wherein the vehicle body reinforcing structure member includes a connection member, and
the end portions of the first reinforcing rod are connected to the end portions of the second reinforcing rod by the connection member and fixed at the left side and the right side of the vehicle body.

10. The electric vehicle according to claim 2, wherein the first reinforcing rod and the second reinforcing rod are hollow rods.

11. The electric vehicle according to claim 1, wherein the vehicle body reinforcing structure member is attached to a bottom side of the vehicle body and adjacent to a rear portion of the battery pack.

12. The electric vehicle according to claim 1, wherein the fixing bracket is attached to both front and rear sides of the vehicle body reinforcing structure member.

\* \* \* \* \*